March 18, 1947.   H. J. KNAGGS ET AL   2,417,504
CABLE TENSION REGULATOR
Filed May 11, 1944
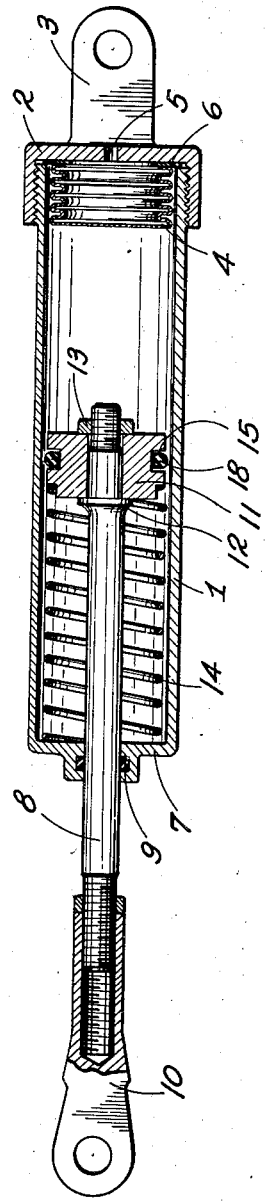
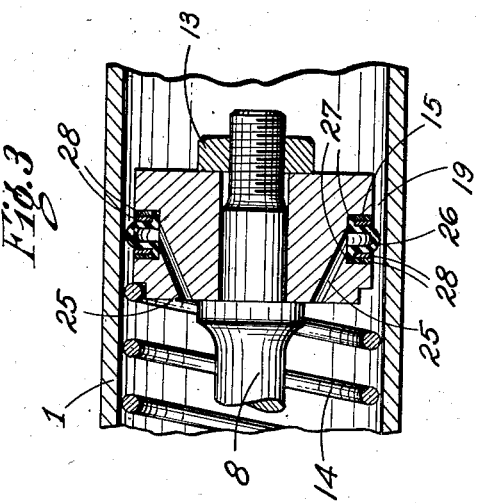
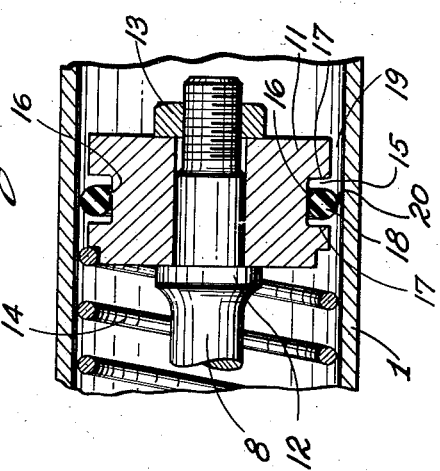
INVENTORS
GEORGE H. HUFFERD
& HAROLD J. KNAGGS
BY
*Richey + Watts*
ATTORNEYS Patented Mar. 18, 1947

2,417,504

UNITED STATES PATENT OFFICE 2,417,504

CABLE TENSION REGULATOR

Harold J. Knaggs, Cleveland, and George H. Hufferd, Shaker Heights, Ohio, assignors to The Weatherhead Company, Cleveland, Ohio, a corporation of Ohio Application May 11, 1944, Serial No. 535,178

4 Claims. (Cl. 74—501)

This invention relates generally to tension regulators, and particularly to a tension regulator and lost motion take-up for force transmitting members especially suited for use on control cables of airplanes.

Where the operating loads are relatively light, or where lost motion is not objectionable, force transmitting members such as linkwork or cables may be kept taut by a spring or the like. In other applications, however, the operating loads greatly exceed the desired constant tension, and it is necessary that slack caused by thermal changes and the like be taken up.

A typical example of such an application is an airplane constructed mainly of aluminum alloys with a steel cable connected at widely separated points to a force applying means controlled by the pilot and a rudder or other control surface. Since the coefficient of expansion of the steel is relatively low as compared with that of the aluminum alloy, and the temperature of the plane and cables may vary from a temperature as high as about plus 160° F. to as low as about −60° F., the differential expansion and contraction of the control cable and the airplane is a substantial amount, which must be compensated for to avoid the cable becoming slack and the pilot losing control of the plane. Likewise, the constant tension it is desirable to apply to the cable is relatively low compared to the operating loads.

The present invention aims to maintain constant tension on a tension member throughout wide ranges of temperature and even when that member is carried by a structure which has a coefficient of thermal expansion widely different from that of the member, and also aims to prevent extension of a tension member when the operating loads are applied thereto. These aims are achieved by the use of means which automatically compensates for length variations in the member and in the structure to which it is attached, due to temperature changes, and which automatically resists extension when the forces intended to be transmitted by the member are applied thereto.

In the drawings accompanying and forming a part of this specification:

Fig. 1 is a central, cross sectional view, partly in elevation, of one embodiment of the present invention;

Fig. 2 is a fragmentary, enlarged view of part of the apparatus of Fig. 1; and

Fig. 3 is a view corresponding to Fig. 2 but of a modified form of piston and piston packing.

The drawings show an embodiment of the present invention which is particularly suited to use with cables, for example, steel cables used in actuating control members such as rudders, elevators, ailerons and the like of airplanes. The cylinder 1 has a detachable end wall 2 provided with an ear 3 for attachment to a cable. An expansible bellows 4 of the conventional type is located within the cylinder 1 and is attached to end wall 2 with the interior of the bellows being in communication with the atmosphere outside of the cylinder by way of a passage 5 in the end wall 2. When the end wall 2 is screwed onto the cylinder 1 it compresses the flange 6 of bellows 4 against cylinder 1 and thereby hermetically seals that end of the cylinder.

The opposite end wall 7 of the cylinder is provided with an opening through which a piston rod 8 slidably extends. Packing 9 carried by wall 7 and engaging rod 8 serves to seal the said opening against flow of liquid or air therethrough. The rod 8 is adjustably connected to cable connector 10 by screw threaded engagement therewith and, within the cylinder, rod 8 carries a piston 11 between a shoulder 12 integral with the rod and a nut 13 screw threaded on the rod. A spring 14 is compressed between end wall 7 and the opposed side of the piston 11. Piston 11 has a peripheral groove 15, defined by a bottom wall 16 and axial end walls 17, in which a packing 18 is mounted. The packing 18 shown in Figs. 1 and 2 is an endless ring, substantially circular in cross section, and composed of resilient, rubber-like material. The ring 18 is of such a size as normally to bear against the bottom wall 16 of groove 15.

The outside diameter of piston 11 is less than the inside diameter of the inner cylindrical surface of cylinder 1, thereby providing an annular space 19, while the outside diameter of the ring 18 is normally greater than the diameter of the piston but is very slightly less than the diameter of the inner cylindrical surface of the cylinder 1, thereby providing a radially very short annular space 20, as is better illustrated in Fig. 2. This space 20 may extend only part way around the piston, if preferred, or if gravity or other forces applied to the piston close the space on one side.

The remaining space in cylinder 1, that is, the space not occupied by bellows 4, piston 11, rod 8, spring 14, nut 13 and packing 16, is substantially completely filled with a suitable liquid. Any liquid is suitable for use in the cylinder which retains its fluidity throughout the temperature range to which the particular cylinder is to be subjected in operation.

The operation of the tension regulator of Figs. 1 and 2 is substantially as follows: Let it be assumed that that device is assembled with and constitutes a part of a steel cable on an airplane structure composed of aluminum alloys or other metals having a higher coefficient of expansion than steel, with the cable attached at one end to the pilot's controls and at the other end to a rudder remote from those controls. Also assume that the airplane is on the ground and that the tension on the cable was adjusted by relative movement of connector 10 on piston rod 8, to about 60 pounds when the temperature of the plane and cable was about 70° F., and that the spring 14 is capable of resisting that pressure and preventing movement of the piston in the cylinder. If the temperature of the plane and cable increases to, say 150° F., the distance between the points of attachment of the cable to the plane increases gradually according to the coefficient of expansion of the highly expansible metal of the plane, while the thermal expansion of the cable is considerably less in amount. This difference in amount of expansion tends to increase the tension force originally applied which compresses the spring and moves the piston 11 toward end wall 7 of cylinder 1. The rate of this movement is so gradual as to be almost imperceptible and takes place as the temperature rises. As piston 11 moves toward end wall 7 of the cylinder, it forces liquid through space 20, past the piston and packing 18 and into the space on the other side of the piston, that is, into the space in which bellows 4 is located. As piston 11 moves toward wall 7, part of rod 8, which originally occupied space in the cylinder, moves out of the cylinder, thereby providing space not previously filled with liquid. This space is filled partly by thermal expansion of the liquid in the cylinder and partly by expansion of bellows 4 due to atmospheric pressure within the bellows. If, on the other hand, the plane and its parts are cooled gradually to a low temperature, for example —50° F., similar but opposite actions take place. During such cooling the distance between the points of attachment of the cable to the plane decreases to a greater extent than the cable between those points. As a result, spring 14 expands and moves the piston 15 slowly toward end 2 of the cylinder, bringing more of rod 8 into the cylinder and causing liquid to flow through space 20, past the piston and packing 18 and into the space in which spring 14 is located. The space occupied in the cylinder by the additional incoming parts of rod 8 is partly offset by the thermal contraction of the liquid and any additional space required for the rod is obtained by contraction of bellows 4. Thus, it will be seen that the above described tension regulator will maintain a substantially uniform tension on a tension member throughout wide ranges of temperature and even when the structure carrying the member has a greater coefficient of expansion than the member.

Airplane cables have rather heavy tensional forces suddenly applied to them during operation. For example, when the tension normally applied to such an airplane cable is on the order of about 60 pounds, the operating loads transmitted by the cable amount to as much as several hundred pounds. According to the present invention when the operating loads are applied to the cable, the piston is effectively and promptly locked in position in cylinder 1. This locking is accomplished in the following manner: When increased tension force is suddenly applied, it tends to move piston 11 rapidly toward end wall 7. Since there is only a small space 20 between the outer periphery of packing 18 and the inner surface of cylinder 1, through which the liquid may flow to accommodate such movement of piston 11, the pressure applied by the piston to the liquid in the space in which spring 14 is located forces packing 18 axially against the opposite end wall 17 of the groove 15 and then deforms or forces the packing radially into close fitting, substantially liquid sealing contact with the cylinder wall. In this manner the liquid is prevented from flowing past the piston and the suddenly applied tension forces are effectively resisted, thereby preventing lengthening of the regulator. This locking action takes place whenever there is a relatively sudden increase in the amount of tension forces applied to the regulator and continues so long as those forces are maintained. When the tension applied to the device is decreased to approximately the initial tension, or until the packing 18 may become smaller radially and thereby permit liquid to flow between it and the cylinder wall, the locking action of the device ceases. Immediate locking of the piston when the operating loads are applied is obtained by making the clearance space 20 between the packing ring and the cylinder wall relatively small, on the order, for example, of .015 to .020 of an inch. Since the minimum rate at which the operating loads are applied is many times the maximum rate at which the piston moves to accommodate thermal expansion and contraction, any application of the operating loads constitutes a sudden increase in tension on the cable, compared with the movements resulting from expansion and contraction. Thus the clearance 20 is made just sufficiently large to avoid locking the piston at the maximum rate of relative movement under the temperature changes to which the parts are subjected in use, and the packing then locks the piston with a minimum of lost motion upon any application of the operating forces to the cable.

Fig. 3 shows a modification of the device of Figs. 1 and 2, the main difference being in the provision of passages 25 leading through the piston from one end thereof to the bottom of groove 15; and in the use of a different packing in that groove. In this instance the packing comprises a generally U-shaped, hollow, resilient packing 26 having axial flanges 27 engaging with the bottom wall 16 of groove 15 and radially expansible rings 28 in the groove on opposite sides of the ring and engageable with the flanges 27 of the latter. Preferably these rings 28 are transversely split so that they may expand and contract radially when liquid under pressure flows through passages 25 against the inner surface of ring 26 with resultant movement or deformation of that ring tending to press rings 28 into engagement with the inner cylindrical surface of cylinder 1. Each set of these rings serves to support the packing 26 axially on the side opposite the side against which increased liquid pressure is applied and also, by bearing against the inner wall of the cylinder, to prevent extrusion of the packing into the space 19 between the piston and cylinder. The operation of the device of Fig. 3 is substantially the same as that previously described in connection with Figs. 1 and 2, the main difference being in the performance of packing 26 and rings 28.

It will be obvious that many variations of the structures hereinabove described may be made without materially changing the mode of operation and results of the described devices and it is contemplated and intended that all such variations will be included within the appended claims.

Having thus described the invention so that others skilled in the art may be able to understand and practice the same, we state that what we desire to secure by Letters Patent is defined in what is claimed.

We claim:

1. A tension regulator comprising a cylinder having an opening through one end wall, a piston rod extending through the said end wall opening, liquid sealing means in said opening about said rod, a piston attached to the rod in the cylinder and having a peripheral circumferential groove, said piston having passages leading from one side of the piston through the bottom of said groove, resilient means compressed between said piston and said end wall of the cylinder, resilient packing U-shaped in cross section in said groove and liquid substantially filling the remaining space in the cylinder, said packing being normally out of contact throughout part of its periphery with the opposed cylindrical wall of the cylinder and being movable into full peripheral and liquid sealing contact with said cylindrical wall under the influence of forces suddenly applied by the liquid to the inner surface of said packing, and attaching means on the piston rod and cylinder.

2. In a device of the class described, a cylinder, a piston reciprocably mounted in the cylinder and having a diameter smaller than the cylinder wall providing a fluid passageway between said piston and said cylinder wall, said piston being formed with a peripheral groove defined by spaced side walls and a bottom wall fixed relative to each other, and annular resilient packing member positioned in said groove, the periphery of said packing member, in normal position, being smaller than said cylinder wall so as to provide an open passageway between said packing and said cylinder wall, said packing being deformable by fluid pressure thereagainst into engagement with said cylinder wall and a side wall of said groove so as to seal said passageway, and said packing returning to its normal position by its own resilience when relieved of such fluid pressure.

3. In a device of the class described, a cylinder, a piston reciprocably mounted in said cylinder having a diameter smaller than the cylinder wall providing a fluid passage between the piston and the cylinder, said piston being formed with a peripheral groove defined by spaced side walls and a bottom wall fixed relative to each other, an annular packing member seated in said groove and normally spaced from the cylinder wall throughout at least part of its circumferential length to provide an open passageway between said packing and said cylinder wall, fluid ducts leading from one side of said piston to the bottom of said groove, said packing being deformable by fluid pressure applied to said one side of said piston into engagement with the cylinder wall throughout its circumferential length.

4. A tension regulator comprising a cylinder having end walls, a piston rod extending through an opening in one end wall, a piston attached to the rod in the cylinder and having a circumferential groove, a spring compressed between said piston and the last mentioned end wall of said cylinder, tension members connected to said rod and said cylinder to balance the force of said spring, an annular packing member seated in the groove in said piston, liquid substantially filling the remaining space in the cylinder, said packing being normally spaced from the cylinder wall throughout at least part of its circumferential length to provide an open passageway between said packing and said cylinder wall, fluid ducts leading from the bottom of said groove at the side of said piston engaged by said spring, said packing being deformable by fluid pressure transmitted through said ducts into engagement with the cylinder wall throughout its circumferential length.

HAROLD J. KNAGGS.
GEORGE H. HUFFERD.

REFERENCES CITED

The following references are of record in the file of this patent:

UNITED STATES PATENTS

| Number | Name | Date |
|---|---|---|
| 564,351 | Vaughan | July 21, 1896 |
| 2,196,337 | Loweke | Apr. 9, 1940 |
| 2,314,404 | Katcher | July 6, 1943 |
| 2,323,352 | Pitts | Apr. 9, 1940 |
| 2,196,436 | Briggs | Dec. 19, 1944 |
| 2,365,247 | Carlton | Feb. 6, 1945 |
| 2,369,007 | Beecher | May 1, 1945 |
| 2,375,050 | Tauscher | |

FOREIGN PATENTS

| Number | Country | Date |
|---|---|---|
| 177,010 | Swiss | Aug. 1 1935 |